United States Patent
Presby et al.

(10) Patent No.: US 6,445,496 B1
(45) Date of Patent: Sep. 3, 2002

(54) POINT-TO-MULTIPOINT FREE-SPACE WIRELESS OPTICAL COMMUNICATION SYSTEM

(75) Inventors: Herman Melvin Presby, Highland Park; John A. Tyson, Pottersville, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/679,930

(22) Filed: Oct. 5, 2000

(51) Int. Cl.$^7$ .................. G02B 17/06; H04B 10/12
(52) U.S. Cl. ............ 359/366; 359/152; 359/188; 359/195
(58) Field of Search .................. 359/195, 366, 359/729, 731, 859, 152, 188

(56) References Cited

U.S. PATENT DOCUMENTS

| | | | |
|---|---|---|---|
| 3,752,559 A | * 8/1973 | Fletcher et al. | 359/366 |
| 3,961,179 A | * 6/1976 | Kuffer | 250/203.2 |
| 4,439,012 A | * 3/1984 | Christy | 359/859 |
| 4,923,293 A | * 5/1990 | Nelles et al. | 359/364 |
| 5,060,304 A | 10/1991 | Solinsky | |
| 5,790,182 A | * 8/1998 | St. Hilaire | 359/366 |
| 6,091,528 A | 7/2000 | Kanda | |

FOREIGN PATENT DOCUMENTS

EP 0 607 906 A1 7/1994

* cited by examiner

Primary Examiner—Jon Henry
(74) Attorney, Agent, or Firm—Ryan, Mason & Lewis, LLP

(57) ABSTRACT

A free-space wireless optical communication system is disclosed that utilizes a telescope design having aspherical mirrors, such as a Ritchey-Chretien (RC) telescope. RC telescopes are characterized by a concave primary mirror and a convex secondary mirror each having a hyperbolic shape. The disclosed mirror configuration provides a larger focal plane that allows for automatic alignment between a transmitter and receiver with a stationary or fixed mirror design, further contributing to a lower fabrication cost. Among other benefits, the larger focal plane permits an n×n fiber array to be positioned in the focal plane of the RC optical telescope, thereby enabling point-to-multipoint communications with a single optical telescope. Each fiber in the n×n fiber array of a transmitting telescope can be focused on a different receiving telescope in a wireless optical communication system. In this manner, each fiber in the n×n fiber array sends optical energy over a distinct path to address a given receiving telescope. Likewise, for a multipoint-to-point communication system, an n×n fiber array can be positioned in the focl plane 330 of the RC optical receiving telescope, with each fiber in the n×n fiber array receiving optical energy over a distinct path from a given transmitting telescope. A number of fabrication techniques are also disclosed that permit the optical telescopes of the present invention to be fabricated at a reasonable cost that permits such optical telescopes to be deployed in wireless optical communication systems.

22 Claims, 5 Drawing Sheets

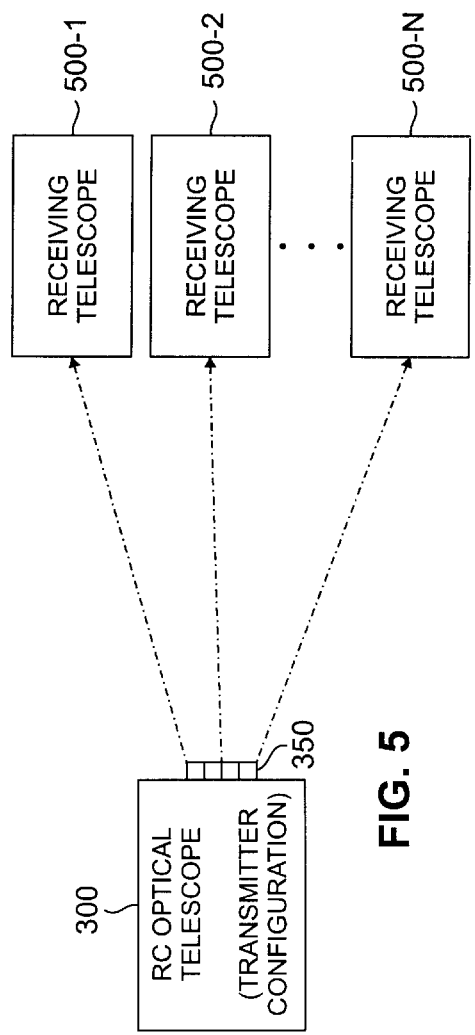
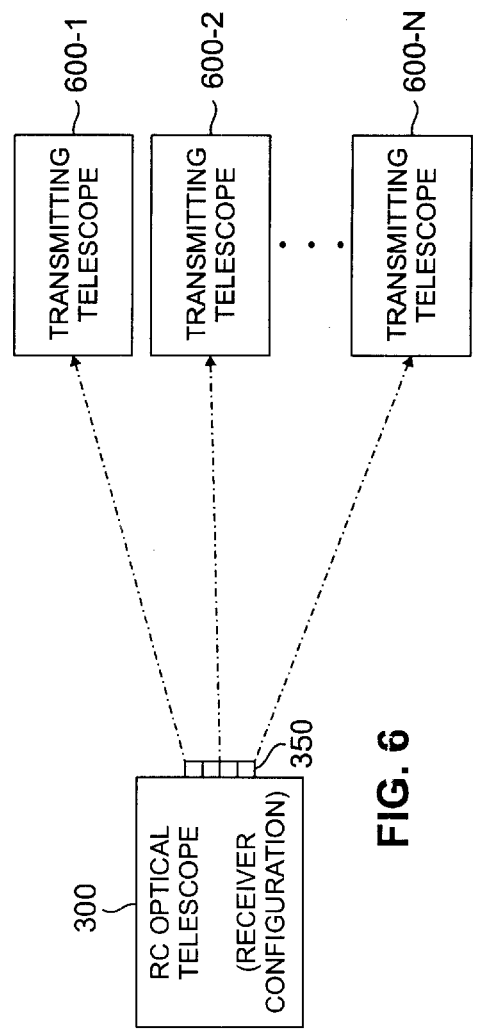

POINT-TO-MULTIPOINT FREE-SPACE WIRELESS OPTICAL COMMUNICATION SYSTEM

CROSS-REFERENCE TO RELATED APPLICATIONS

The present invention is related to United States patent application Ser. No. 09/679,159, entitled "Telescope for a Free-Space Wireless Optical Communication System," United States patent application Ser. No. 09/680,165, entitled "Method and Apparatus for Controlling Received Power Levels Within a Free-Space Optical Communication System," United States patent application Ser. No. 09/680,336, entitled "Method and Apparatus for Aligning Telescopes Within a Free-Space Optical Communication System" and United States patent application Ser. No. 09/680,812, entitled "Method and Apparatus for Communication Signal Autotracking Within a Free-Space Optical Communication System," each filed contemporaneously herewith, assigned to the assignee of the present invention and incorporated by reference herein.

FIELD OF THE INVENTION

The invention is related to the field of free-space wireless optical communications, and more particularly, to improved optical telescopes for free-space wireless optical communication systems.

BACKGROUND OF THE INVENTION

In wireless optical communication systems, the optical signal propagates in free space. In contrast to radio frequency (RF) communication systems, optical wireless communication systems are extremely directional. Thus, precise alignment is required between the transmitting unit and the receiving unit, often referred to as transmitting and receiving telescopes, respectively. The highly directional nature of wireless optical communication systems, however, provides the advantage of improved security, since the optical signal can only be intercepted along the path of the transmitted light. In addition, the optical portion of the spectrum is not regulated by the government. Thus, a government license is not required to operate the optical transmitter and receiver telescopes, unlike a comparable radio frequency (RF) wireless communication system. More importantly, the bandwidth or information carrying capacity of optical wireless systems is much greater than that of RF wireless communication systems.

Wireless optical communication systems have an advantage over fiber-based optical communication systems as well, since wireless communication systems do not require a physical connection between the transmitter and the receiver. In an urban environment, it can be difficult to install a physical connection, such as an optical fiber, between two buildings, especially if the buildings are separated by a street, another building or a body of water. A wireless optical link only requires an unobstructed path between the transmitter and the receiver, which is generally easier to achieve in an urban environment than a physical link.

FIG. 1 illustrates a conventional wireless optical system 100. As shown in FIG. 1, a conventional wireless optical system 100 typically includes a transmitting telescope 110, for forming a transmitted beam 115 that is aimed at a receiving telescope 120. Typically, the optical signal to be transmitted is originally emitted from a semiconductor laser and then may be amplified with an optical amplifier. The emitting facet of the laser (or an optical fiber into which the laser is coupled) lies at the front focal plane of the transmitting telescope 110. The received signal is typically collected with a photodetector (or an optical fiber connected to the photodetector) positioned at the focal plane of the receiving telescope 120. For a more detailed discussion of conventional wireless optical systems 100, see, for example, P. F. Szajowski, "Key Elements of High-Speed WDM Terrestrial Free-Space Optical Communications Systems," SPIE Paper No. 3932–01, Photonics West (Jan. 2000), incorporated by reference herein.

In many wireless optical systems, it is desirable for a single transmitting telescope to communicate with a number of receiving telescopes (often referred to as "point-to-multipoint" communications), or for a single receiving telescope to receive signals from a number of transmitting telescopes ("multipoint-to-point" communications). With conventional wireless optical systems, however, point-to-multipoint communications typically require a dedicated transmitting and receiving telescope for each optical path. See, for example, PCT application Ser. Nos. PCT/US99/14710 and PCT/US99/15973. A need therefore exists for a point-to-multipoint communication system that permits a single transmitting telescope to communicate with a number of distributed receiving telescopes.

SUMMARY OF THE INVENTION

Generally, a free-space wireless optical communication system is disclosed that satisfies the above-stated objectives of improved bandwidth, link range and reliability, relative to conventional designs. The disclosed free-space wireless optical communication system utilizes a telescope design having aspherical mirrors, such as a Ritchey-Chretien (RC) telescope. RC telescopes are characterized by a concave primary mirror and a convex secondary mirror each having a hyperbolic shape.

The present invention provides a mirror configuration that allows the primary and secondary mirrors to be positioned closer together than conventional designs, allowing for a very compact system. The disclosed mirrors are not formed of thick bulk glass. Thus, the mirrors can be thin and lightweight, allowing for a lightweight telescope unit. In addition, the present invention provides a larger focal plane that allows for automatic alignment between a transmitter and receiver with a stationary or fixed mirror design, further contributing to a lower fabrication cost. Furthermore, the mirrors can be fabricated with large diameters, to allow the transmission of high beam intensities at eye-safe levels since the energy is spread over a large area.

Among other benefits, the larger focal plane permits an n×n fiber array to be positioned in the focal plane of the RC optical telescope, thereby enabling point-to-multipoint communications with a single optical telescope. Each fiber in the n×n fiber array of a transmitting telescope can be focused on a different receiving telescope in a wireless optical communication system. In this manner, each fiber in the n×n fiber array sends optical energy over a distinct path of address a given receiving telescope. Likewise, for a multipoint-to-point communication system, an n×n fiber array can be positioned in the focal plane 330 of the RC optical receiving telescope, with each fiber in the n×n fiber array receiving optical energy over a distinct path from a given transmitting telescope.

A number of fabrication techniques are also disclosed that permit the optical telescopes of the present invention to be fabricated at a reasonable cost that permits such optical telescopes to be deployed in wireless optical communication systems.

A more complete understanding of the present invention, as well as further features and advantages of the present invention, will be obtained by reference to the following detailed description and drawings.

BRIEF DESCRIPTION OF THE DRAWINGS

FIG. 5 illustrates a point-to-multipoint transmitter configuration in accordance with the present invention; and FIG. 6 illustrates a multipoint-to-point receiver configuration in accordance with the present invention.

DETAILED DESCRIPTION

Figure 1:
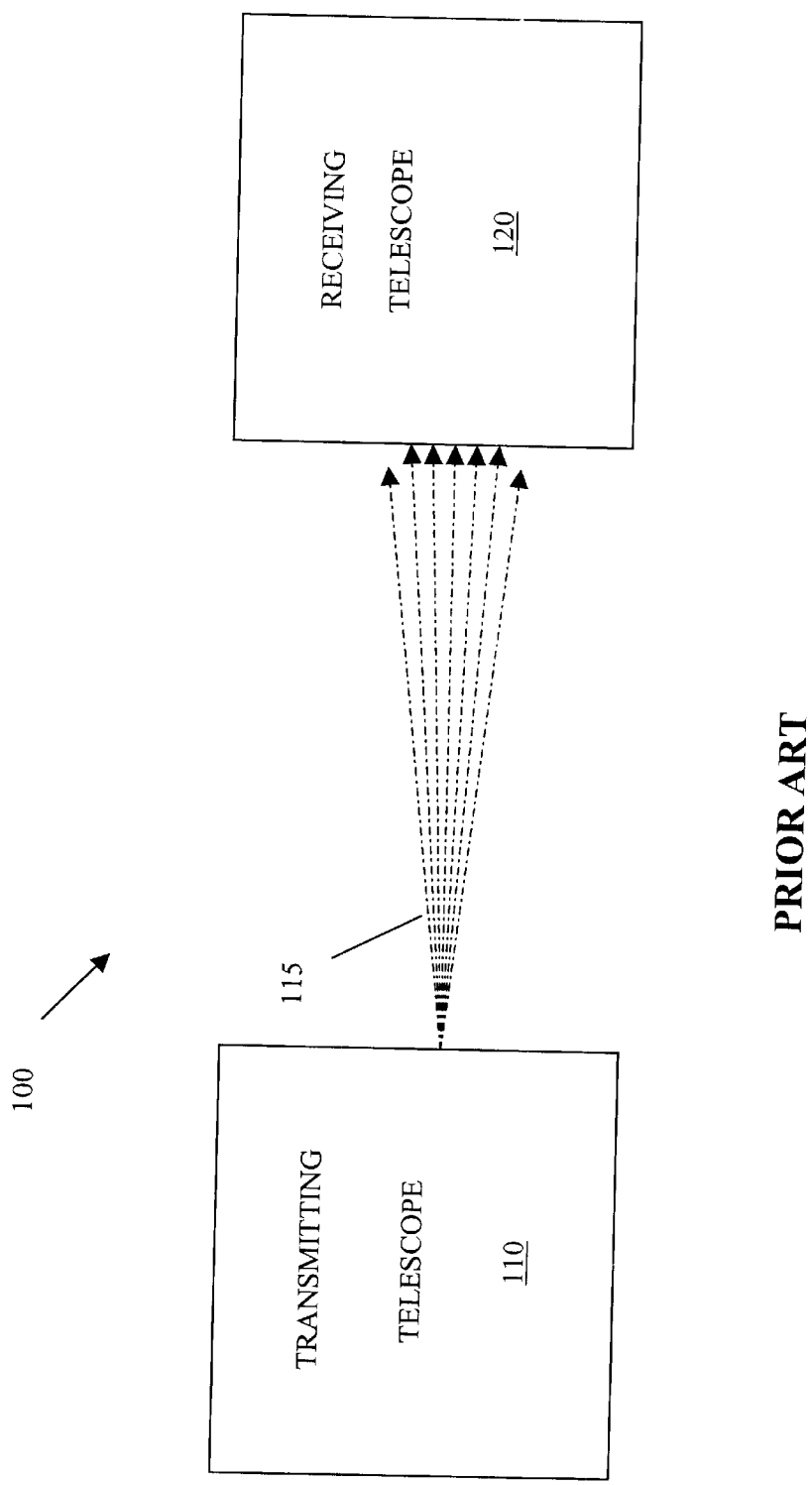
FIG. 1 is a block diagram of a conventional wireless optical communication system.
Figure 2:
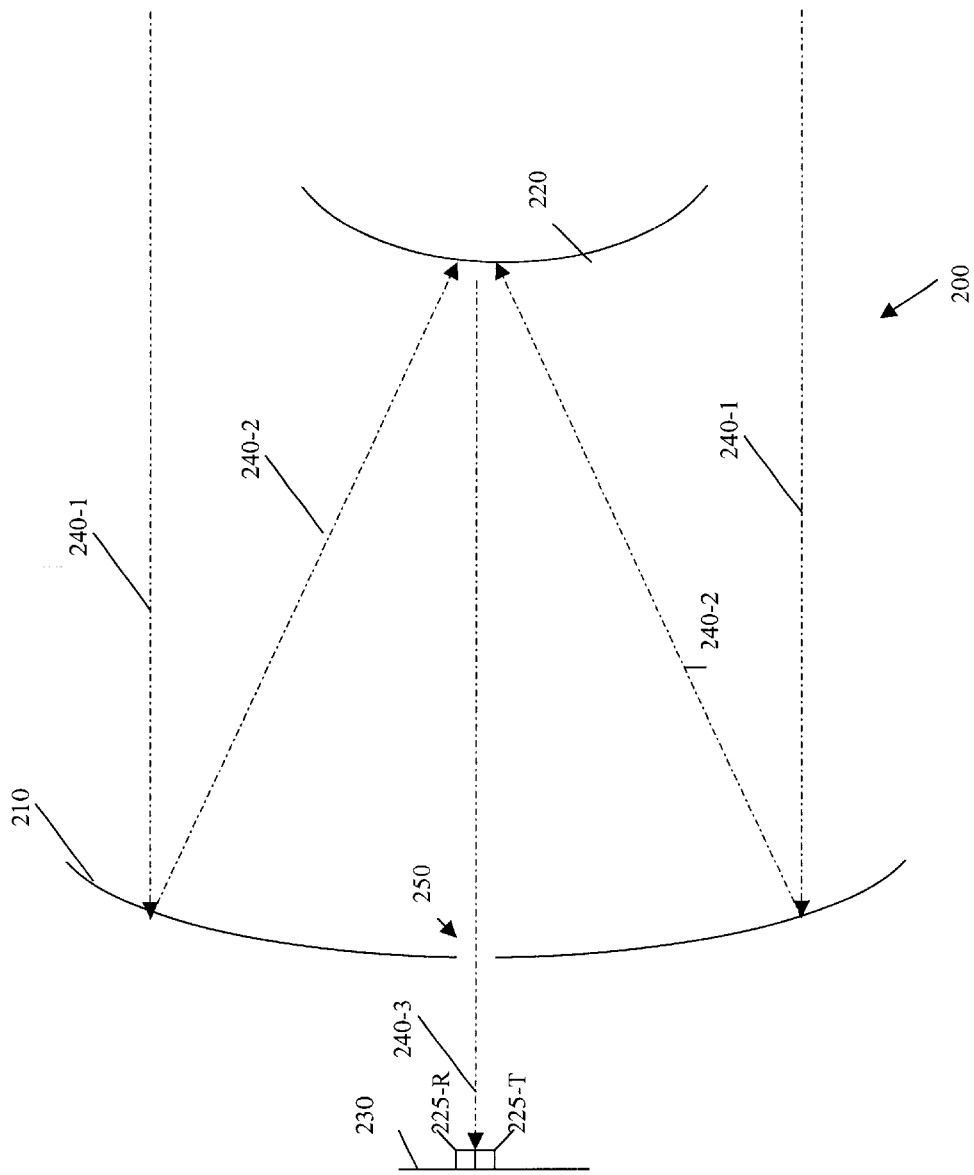
FIG. 2 illustrates a Ritchey-Chretien (RC) optical telescope that may be used in the wireless optical communication system of FIG. 1 in accordance with the present invention.

The present invention provides improved optical telescopes for wireless optical communication systems that satisfy the above-stated objectives of improved bandwidth, link range and reliability, relative to conventional designs. According to one feature of the present invention, Ritchey-Chretien (RC) telescopes, discussed further below in conjunction with FIG. 2, are utilized in wireless optical communication systems. RC telescopes have previously been used only for large astronomical telescopes, including the Hubble Space Telescope. For a detailed discussion of convention applications and parameters of RC telescopes, see, for example, Daniel J. Schroeder, Astronomical Optics, 94–109 (Academic Press, 1987), incorporated by reference herein. Generally, RC telescopes are characterized by a concave primary mirror and a convex secondary mirror each having a hyperbolic shape.

FIG. 2 illustrates an RC optical telescope 200 in accordance with the present invention. As shown in FIG. 2, the optical telescope 200 is comprised of a concave primary mirror 210 and a convex secondary mirror 22, each having a hyperbolic shape. As discussed further below, the present invention provides the primary mirror 210 and secondary mirror 220 in a configuration that allows the mirrors 210, 220 to be positioned closer together than convention designs. The primary mirror 210 reflects the received optical signal 240-1 to the secondary mirror 220 that in turn redirects the received optical signal 240-2 through a hole 250, generally in the center of the primary mirror 210, to an optical detector 225-R positioned at the focal plane 230, for collection and processing. The focal plane 230 may also be positioned in front of the primary mirror 210, as would be apparent to a person of ordinary skill in the art. Although illustrated as a single on-axis ray, the received optical signal 240 is a conically converging bundle of light coming to a focus at the optical detector 225-R.

The RC optical telescope 200 of the present invention can be further characterized by the conic constants of the mirrors 210, 220. Specifically, while prior art telescopes are characterized by mirrors having conic constants of 0 (spherical mirrors) and −1 (paraboloidal mirrors), the present invention contemplates hyperboloidal and aspherical mirrors 210, 220 having conic constants that are less than −1. The precise specifications for an illustrative RC optical telescope 200 in accordance with the present invention are set forth below, in a section entitled "Hyperbolic Mirror Specifications."

Generally, the hyperbolic mirrors of the present invention are more complex and expensive to fabricate than the spherical mirrors or lenses that have typically been utilized in wireless optical communication systems. Thus, as discussed further below in a section entitled "Hyperbolic Mirror Fabrication Techniques," another feature of the present invention provides several techniques that permit the optical telescopes of the present invention to be fabricated at a reasonable cost that permits such optical telescopes to be deployed in wireless optical communication systems.

According to yet another feature of the present invention, the RC telescopes of the present invention provide a larger field of view 230 than conventional Newtonian designs that focus a received signal at one ideal point. Rather, the hyperbolic mirror design of the present invention provides a large focal plane or collection area 230 (on the order of one square centimeter) for capturing the received signal 240. While the illustrative optical telescope 200 in FIG. 2 is shown only in a receiving mode, the optical telescope 200 can be configured in transmitting or bi-directional modes as well, as would be apparent to a person of ordinary skill in the art. conventional designs. The primary mirror 210 reflects the received optical signal 240-1 to the secondary mirror 220 that in turn redirects the received optical signal 240-2 through a hole 250, generally in the center of the primary mirror 210, to an optical detector 225-R positioned at the focal plane 230, for collection and processing. The focal plane 230 may also be positioned in front of the primary mirror 210, as would be apparent to a person of ordinary skill in the art. Although illustrated as a single on-axis ray, the received optical signal 240 is a conically converging bundle of light coming to a focus at the optical detector 225-R.

The RC optical telescope 200 of the present invention can be further characterized by the conic constants of the mirrors 210, 220. Specifically, while prior art telescopes are characterized by mirrors having conic constants of 0 (spherical mirrors) and −1 (paraboloidal mirrors), the present invention contemplates hyperboloidal and aspherical mirrors 210, 220 having conic constants that are less than −1. The precise specifications for an illustrative RC optical telescope 200 in accordance with the present invention are set forth below, in a section entitled "Hyperbolic Mirror Specifications."

Generally, the hyperbolic mirrors of the present invention are more complex and expensive to fabricate than the spherical mirrors or lenses that have typically been utilized in wireless optical communication systems. Thus, as discussed further below in a section entitled "Hyperbolic Mirror Fabrication Techniques," another feature of the present invention provides several techniques that permit the optical telescopes of the present invention to be fabricated at a reasonable cost that permits such optical telescopes to be deployed in wireless optical communication systems.

According to yet another feature of the present invention, the RC telescopes of the present invention provide a larger field of view 230 than conventional Newtonian designs that focus a received signal at one ideal point. Rather, the hyperbolic mirror design of the present invention provides a large focal plane or collection area 230 (on the order of one square centimeter) for capturing the received signal 240. While the illustrative optical telescope 200 in FIG. 2 is shown only in a receiving mode, the optical telescope 200 can be configured in transmitting or bi-directional modes as well, as would be apparent to a person of ordinary skill in the art.

In a transmission mode, the optical signal to be transmitted is emitted from a semiconductor laser. Thus, the emitting facet of the laser (or a transmitting optical fiber 225-T into which the laser is coupled) lies at the focal plane 230 of the transmitting telescope 200. The received signal 240 is collected with a photodetector (or a receiving optical fiber 225-R connected to the photodetector) positioned at the focal plane 230 of the receiving telescope 200. Thus, the transmit and receive fibers 225-T, 225-R are positioned in the field of view 230 of the telescope 200, as shown in FIG. 2.

Figure 3:
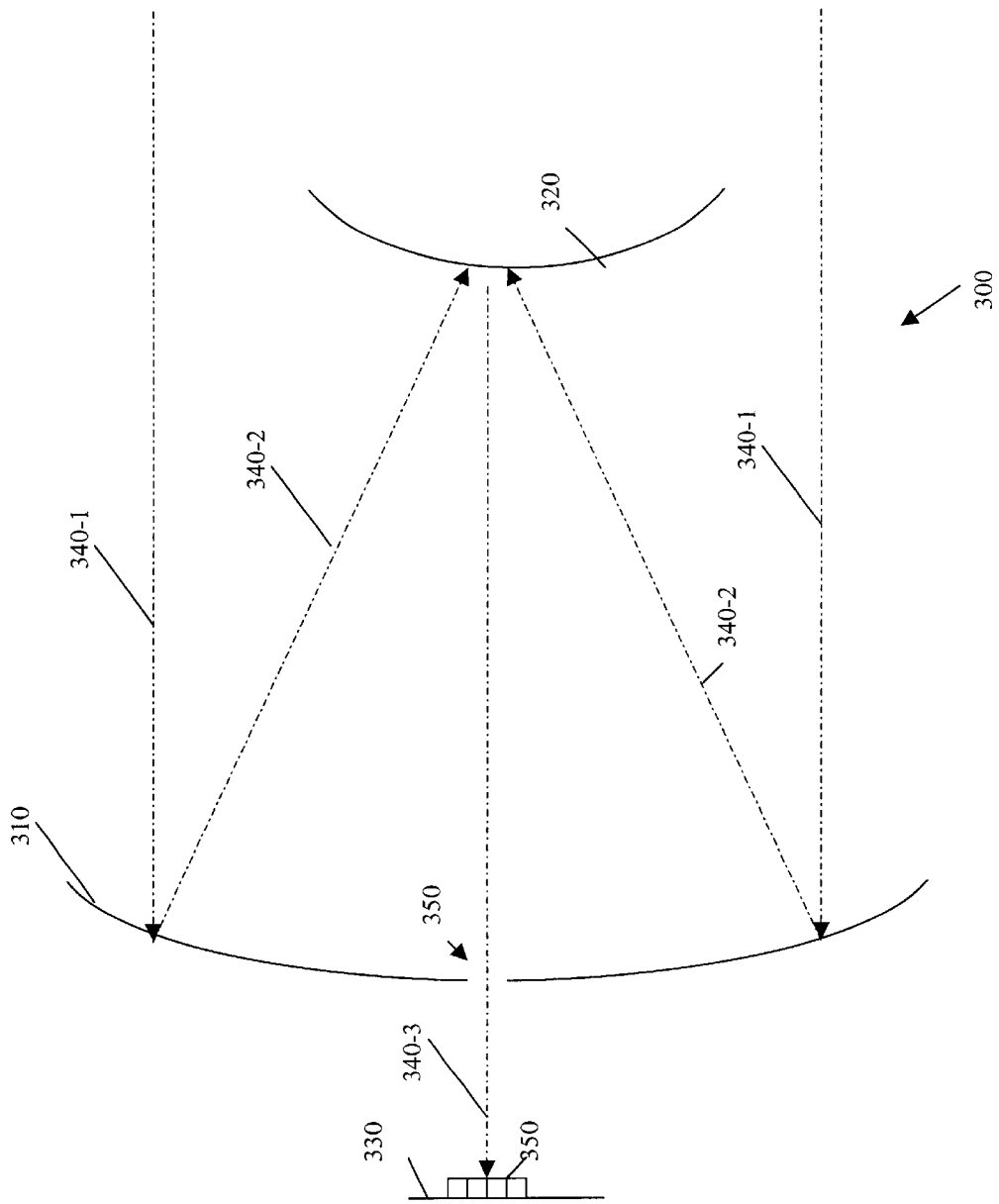
FIG. 3 illustrates a point-to-multipoint communication system in accordance with the present invention.

According to another feature of the present invention, shown in FIG. 3, a point-to-multipoint communication system is achieved by positioning an n×n fiber array 350 in the focal plane 330 of the RC optical telescope 300. Each fiber in the n×n fiber array 350 is focused on a different receiving telescope in the wireless optical communication system. In this manner, each fiber in the n×n fiber array 350 sends optical energy over a distinct path to address a given receiving telescope. Likewise, for a multipoint-to-point communication system, an n×n fiber array 350 can be positioned in the focal plane 330 of the RC optical receiving telescope 300, with each fiber in the n×n fiber array 350 receiving optical energy over a distinct path from a given transmitting telescope.

It is noted that rather than having the beam focused on the photodetector or optical fiber, additional optics in the form of a field lens 260 can be incorporated in the hole 250 of the primary mirror 210 to render a collimated beam exiting the hole 250 in the primary mirror 210 for additional processing. A further focusing lens is then utilized to focus the beam onto the photodetector or into the optical fiber.

Figure 4:
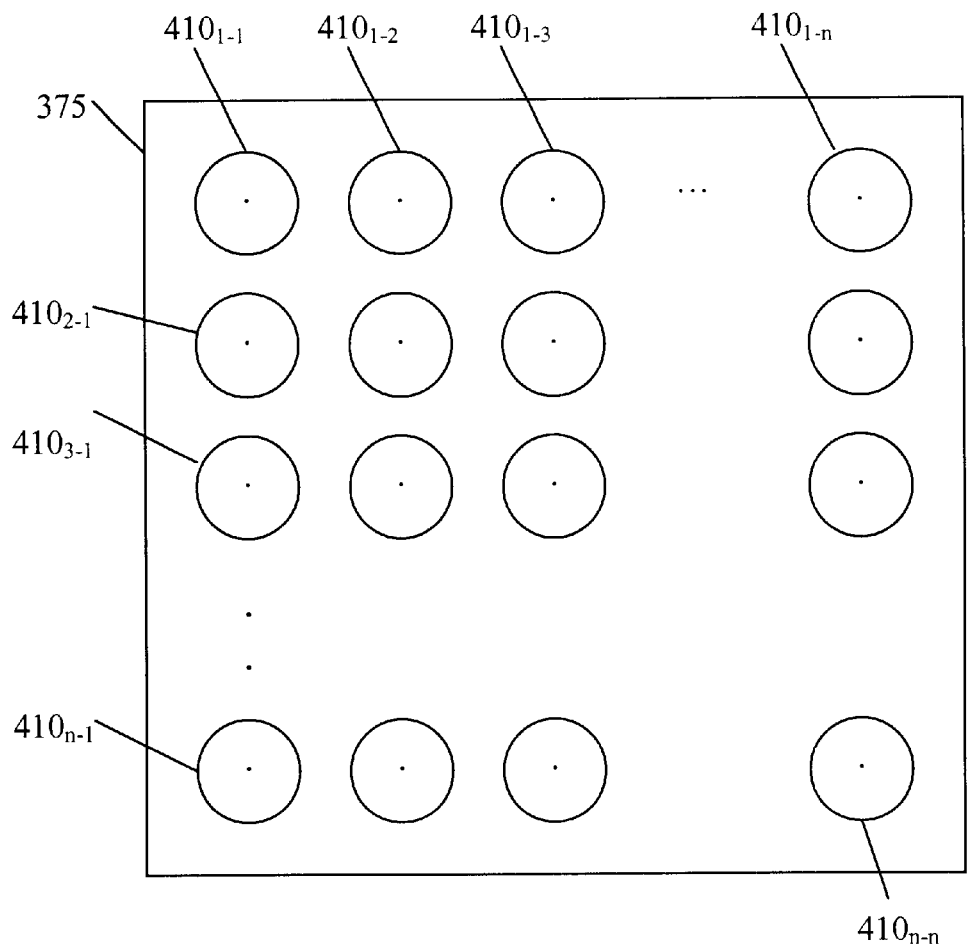
FIG. 4 illustrates an end view of the n×n fiber array of FIG. 3.

FIG. 4 illustrates an end view of the n×n fiber array 350 of FIG. 3. As shown in FIG. 4, the illustrative n×n fiber array 350 is comprised of n rows and n columns of optical fibers $410_{1-1}$ through $410_{n-n}$.

FIG. 5 illustrates a point-to-multipoint transmitter configuration in accordance with the present invention. As shown in FIG. 5, a point-to-multipoint transmitter configuration includes an RC optical telescope 300, as shown in FIG. 3, in optical communication with a plurality of receiving telescopes 500-1 through 500-N (hereinafter, collectively referred to as receiving telescopes 500). Each fiber in the n×n fiber array 350 is focused on a different receiving telescope 500 in the wireless optical communication system. In this manner, each fiber in the n×n fiber array 350 sends optical energy over a distinct path to address a given receiving telescope 500.

FIG. 6 illustrates a multipoint-to-point receiver configuration in accordance with the present invention. As shown in FIG. 6, a multipoint-to-point receiver configuration includes an RC optical telescope 300, as shown in FIG. 3, in optical communication with a plurality of transmitting telescopes 600-1 through 600-N (hereinafter collectively referred to as transmitting telescopes 600). The RC optical telescope 300 includes an n×n fiber array 350 positioned in the focal plane 330 (FIG. 3) of the RC optical receiving telescope 300. Each fiber in the n×n fiber array 350 receives optical energy over a distinct path from a given transmitting telescope 600 in the wireless optical communication system.

Hyperbolic Mirror Fabrication Techniques

As previously indicated, the hyperbolic mirrors of the present invention are generally more expensive to fabricate than the spherical mirrors that have typically been utilized in wireless optical communication systems. Thus, according to another feature of the present invention, a number of fabrication techniques are disclosed that permit the RC optical telescopes of the present invention to be fabricated at a reasonable cost.

According to a first fabrication technique, referred to herein as the "electro-formed metal mirror fabrication technique," a metal alloy material, such as nickel or gold, is deposited using an "inverse metal or glass master," such as a mandril to grow the mirror on the mandril surface. The mandril is intended for repeated use and may be fabricated, for example, using stainless steel or glass. Such electro-formed mirrors can be custom-fabricated by Media Lario S. r. l. of Italy. For information about Media Lario and its electro-formed mirror products, see http://www.media-lario.it/eng/index.htm, incorporated by reference herein.

According to a second fabrication technique, referred to herein as the "diamond-turning mirror fabrication technique," a computer description is generated of the desired mirror shape, then a lathe machines a metal form, such as stainless steel, to produce the mirror in the desired shape. For a general discussion of diamond-turning techniques, see, for example, Theodore T. Saito, "Diamond Turning of Optics: The Past, the Present, and the Exciting Future," Optical Engineering, Volume 17, Number 6,570–73 (1978), incorporated by reference herein.

According to yet another fabrication technique, referred to herein as the "casting fabrication technique," the hyperbolic mirrors are constructed using well-known casting techniques, such as those employed by Ball Aerospace & Technologies Corp. of Boulder, Colo.

Hyperbolic Mirror Specifications

In one particular embodiment, the primary mirror 210 has a diameter of 20 cm and has an asphere or hyperbolic shaped defined by a radius of 25 cm and a conic constant of −1.034. Likewise, the secondary mirror 220 has a diameter of 4.4 cm and has an asphere or hyperbolic shaped defined by a radius of 6.6 cm and a conic constant of −3.14. In this illustrative embodiment, the primary and secondary mirrors 210, 220 were each coated to provide high reflectivity at a wavelength of 1.5 microns. The spacing of the primary and secondary mirrors 210, 220 is on the order of 10 cm.

In another embodiment, the primary mirror 210 has a diameter of 20 cm, and has an asphere or hyperbolic shaped defined by a radius of curvature of 315.8 mm and a conic constant of −1.0667. Likewise, the secondary mirror 220 has a diameter of 50.2 mm and has an asphere or hyperbolic shaped defined by a radius of curvature of 110.8 mm and a conic constant of −4.573. In this embodiment, the primary and secondary mirrors 210, 220 were each coated to provide high reflectivity at a wavelength of 1.5 microns. The spacing of the primary and secondary mirrors 210, 220 is 12 cm. In yet another embodiment, the primary mirror 210 has a diameter of 20 cm, and has an asphere or hyperbolic shaped defined by a radius of curvature of 15 cm and a conic constant of −1.0097. Likewise, the secondary mirror 220 has a diameter of 2.9 cm and has an asphere or hyperbolic shaped defined by a radius of curvature of 2.3 cm and a conic constant of −1.947. In this embodiment, the primary and secondary mirrors 210, 220 were each coated to provide high reflectivity at a wavelength of 1.5 microns. The spacing of the primary and secondary mirrors 210, 220 is 6.5 cm.

Hyperbolic Mirror Features

The hyperbolic mirror design of the present invention provides a number of advantages relative to conventional spherical designs. As already mentioned, the hyperbolic mirrors can be fabricated at a relatively low cost using a number of identified fabrication techniques. In addition, the larger focal plane of the present invention provides for automatic alignment between a transmitter and receiver with a stationary or fixed mirror design, further contributing to a lower fabrication cost. In addition, the larger focal plane permits an n×n fiber array 350 to be positioned in the focal plane 330 of the RC optical telescope 300, as shown in FIG. 3, thereby enabling point-to-multipoint communications with a single optical telescope 300.

In addition, the hyperbolic mirror design of the present invention allows the primary and secondary mirrors 210, 220 to be positioned closer together than conventional designs allowing for a very compact system. Although the particular inter-mirror distances will vary with the conic constants, the illustrative specification set forth above provides an inter-mirror distance of only 5–10 cm.

Since the mirrors are not formed of thick bulk glass, the mirrors can be thin and lightweight, allowing for a light-weight unit. The mirrors can be fabricated with large diameters, to allow the transmission of high beam intensities at eye-safe levels since the energy is spread over a large area. A 20 cm telescope could safely transmit, for example, on the order of 1 watt at a wavelength of 1.5 microns.

It is to be understood that the embodiments and variations shown and described herein are merely illustrative of the principles of this invention and that various modifications may be implemented by those skilled in the art without departing from the scope and spirit of the invention.

What is claimed is:

1. A wireless communication system, comprising at least one Ritchey-Chretien (RC) optical telescope, wherein a fiber array comprised of at least two fibers is positioned at a focal plane of said RC optical telescope, each of said fibers in optical communication with a different remote telescope.

2. The wireless communications system of claim 1, wherein each fiber in said fiber array is focused on a different receiving telescope.

3. The wireless communications system of claim 1, wherein each fiber in said fiber array is focused on a different receiving telescope.

4. The wireless communications system of claim 1, wherein said fiber array is an n×n array.

5. The wireless communications system of claim 1, wherein each fiber in said fiber array can be independently repositioned to maintain alignment with a corresponding remote telescope.

6. A wireless communications system, comprising at least one optical telescope having an aspherical mirror, wherein a fiber array comprised of at least two fibers is positioned at a focal plane of said optical telescope, each of said fibers in optical communication with a different remote telescope.

7. The wireless communications system of claim 6, wherein each fiber in said fiber array is focused on a different receiving telescope.

8. The wireless communications system of claim 6, wherein each fiber in said fiber array is focused on a different transmitting telescope.

9. The wireless communications system of claim 6, wherein said fiber array is an n×n array.

10. The wireless communications system of claim 6, wherein each fiber in said fiber array can be independently repositioned to maintain alignment with a corresponding remote telescope.

11. A Ritchey-Chretien (RC) optical telescope for a wireless communications link, comprising:

a concave aspherical primary mirror;

a convex aspherical secondary mirror; and a receiving unit comprised of an array of at least two fibers positioned at a focal plane of said secondary mirror, each of said fibers in optical communication with a different remote telescope.

12. The RC optical telescope of claim 11, wherein said RC optical telescope is comprised of at least two hyperbolic mirrors.

13. The RC optical telescope of claim 11, further comprising a field lens.

14. The RC optical telescope of claim 11, wherein said two aspherical mirrors are fixed.

15. The RC optical telescope of claim 11, wherein said array of fibers may be repositioned within said focal plane of said RC optical telescope.

16. A Ritchey-Chretien (RC) optical telescope for a wireless communications link, comprising:

a concave aspherical primary mirror;

a convex aspherical secondary mirror; and a transmitting unit comprised of an array of at least two optical fibers positioned at a focal plane of said secondary mirror, each of said fibers in optical communication with a different remote telescope.

17. The RC optical telescope of claim 16, wherein said RC optical telescope is comprised of at least two hyperbolic mirrors.

18. The RC optical telescope of claim 16, further comprising a field lens.

19. The RC optical telescope of claim 16, wherein said two aspherical mirrors are fixed.

20. The RC optical telescope of claim 16, wherein said array of fibers may be repositioned within said focal plane of said RC optical telescope.

21. A method for receiving an optical signal in a multipoint-to-point free-space wireless communication system, comprising the steps of:

capturing said optical signal using an aspherical primary mirror;

reflecting said captured optical signal using an aspherical secondary mirror; and redirecting said captured optical signal using said aspherical secondary mirror to an optical detector within an array of at least two optical detectors positioned at a focal plane of said aspherical secondary mirror, each of said fibers in optical communication with a different remote telescope.

22. A method for transmitting an optical signal in a transmitting telescope of a point-to-multipoint free-space wireless communication system, comprising the steps of:

emitting said optical signal from a semiconductor laser within an array of at least two lasers positioned at a focal plane of said transmitting telescope, each of said lasers in optical communication with a different remote telescope;

capturing said optical signal using an aspherical secondary mirror;

redirecting said captured optical signal using said aspherical secondary mirror to an aspherical primary mirror; and reflecting said captured optical signal into free-space using said aspherical primary mirror.

* * * * *